United States Patent
Kim et al.

(10) Patent No.: US 10,333,581 B2
(45) Date of Patent: Jun. 25, 2019

(54) METHOD FOR FDR SCHEME-USING COMMUNICATION DEVICE TRANSMITTING REFERENCE SIGNALS FOR ESTIMATING CHANNEL OF NON-LINEAR SELF-INTERFERENCE SIGNAL

(71) Applicant: LG ELECTRONICS INC., Seoul (KR)

(72) Inventors: Dongkyu Kim, Seoul (KR); Hyunsoo Ko, Seoul (KR); Kwangseok Noh, Seoul (KR); Sangrim Lee, Seoul (KR); Hojae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 106 days.

(21) Appl. No.: 15/555,933

(22) PCT Filed: Jul. 7, 2016

(86) PCT No.: PCT/KR2016/007389
§ 371 (c)(1),
(2) Date: Sep. 5, 2017

(87) PCT Pub. No.: WO2017/022961
PCT Pub. Date: Feb. 9, 2017

(65) Prior Publication Data
US 2018/0048347 A1 Feb. 15, 2018

Related U.S. Application Data

(60) Provisional application No. 62/199,329, filed on Jul. 31, 2015.

(30) Foreign Application Priority Data

Oct. 28, 2015 (WO) ................ PCT/KR2015/011421

(51) Int. Cl.
*H04B 1/525* (2015.01)
*H04L 25/02* (2006.01)
(Continued)

(52) U.S. Cl.
CPC .......... *H04B 1/525* (2013.01); *H04L 5/0048* (2013.01); *H04L 5/0082* (2013.01); *H04L 5/14* (2013.01);
(Continued)

(58) Field of Classification Search
None
See application file for complete search history.

(56) References Cited

U.S. PATENT DOCUMENTS

2010/0111018 A1* 5/2010 Chang, II .......... H04B 7/15585
370/329
2014/0133411 A1* 5/2014 Park ...................... H04L 5/0058
370/329
(Continued)

FOREIGN PATENT DOCUMENTS

| KR | 101080906 | 11/2011 |
|---|---|---|
| WO | 2013173250 | 11/2013 |
| WO | 2014163433 | 10/2014 |

OTHER PUBLICATIONS

PCT International Application No. PCT/KR2015/011421, Written Opinion of the International Searching Authority dated Feb. 11, 2016, 18 pages.
(Continued)

*Primary Examiner* — Duc T Duong
(74) *Attorney, Agent, or Firm* — Lee, Hong, Degerman, Kang & Waimey PC

(57) ABSTRACT

A method for a FDR scheme-using communication device transmitting reference signals for estimating a channel of a non-linear self-interference signal comprises the step of
(Continued)

transmitting, on a specific symbol of a corresponding subframe, reference signals for estimating the channel of the non-linear self-interference signal, wherein a sequence mapped to the reference signals is a sequence generated in a frequency domain by being discrete Fourier transform (DFT)-converted, and the generated sequence may be mapped, on the frequency domain, to a RE for the reference signals.

12 Claims, 16 Drawing Sheets

(51) Int. Cl.
*H04L 5/00* (2006.01)
*H04L 5/14* (2006.01)
*H04L 27/26* (2006.01)
*H04B 1/04* (2006.01)

(52) U.S. Cl.
CPC ........ *H04L 25/0202* (2013.01); *H04L 27/261* (2013.01); *H04B 1/0475* (2013.01); *H04L 5/0023* (2013.01); *H04L 5/1461* (2013.01); *H04L 25/0226* (2013.01)

(56) References Cited

U.S. PATENT DOCUMENTS

| | | | |
|---|---|---|---|
| 2015/0139284 A1 | 5/2015 | Choi et al. | |
| 2015/0311928 A1* | 10/2015 | Chen | H04B 1/525 375/350 |
| 2016/0211927 A1* | 7/2016 | Mo | H04B 1/123 |
| 2016/0234041 A1* | 8/2016 | Chen | H04L 25/0202 |
| 2016/0330011 A1* | 11/2016 | Lee | H04L 5/0066 |
| 2016/0380653 A1* | 12/2016 | Sheikh | H04B 1/0475 370/282 |
| 2017/0005773 A1* | 1/2017 | Liu | H04B 1/525 |
| 2017/0063518 A1* | 3/2017 | Chen | H04L 27/38 |
| 2017/0163404 A1* | 6/2017 | Liu | H04L 5/14 |
| 2018/0026672 A1* | 1/2018 | Haine | H04B 1/582 333/126 |
| 2018/0375566 A1* | 12/2018 | Hong | H04B 7/15585 |

OTHER PUBLICATIONS

PCT International Application No. PCT/KR2016/007389, Notification of Transmittal of the International Search Report and the Written Opinion of the International Searching Authority, or Declaration dated Oct. 11, 2016, 9 pages.
Ericsson, "NAICS functionality, robustness, and configurability", 3GPP TSG RAN WG1 Meeting #77, R1-142322, May 2014, 5 pages.
Huawei, "Discussion on network assistance signalling for NAICS receivers", 3GPP TSG RAN WG1 Meeting #76, R1-140060, Feb. 2014, 6 pages.
CMCC, "TDD aspects for NAICS", 3GPP TSG RAN WG1 Meeting #78, R1-143240, Aug. 2014, 4 pages.
CMCC, "Remaining issues for NAICS higher-layering signaling", 3GPP TSG RAN WG1 Meeting #78, R1-142867, Aug. 2014, 6 pages.
Samsung, "Performance Impact of Network Assistance Signalling for NAICS", 3GPP TSG RAN WG1 Meeting #76, R1-140893, Feb. 2014, 8 pages.

* cited by examiner

Two-tone ➡ Multi-tone ═══ Spectrum

METHOD FOR FDR SCHEME-USING COMMUNICATION DEVICE TRANSMITTING REFERENCE SIGNALS FOR ESTIMATING CHANNEL OF NON-LINEAR SELF-INTERFERENCE SIGNAL

CROSS-REFERENCE TO RELATED APPLICATIONS

This application is the National Stage filing under 35 U.S.C. 371 of International Application No. PCT/KR2016/007389, filed on Jul. 7, 2016, which claims the benefit of U.S. Provisional Application No. 62/199,329, filed on Jul. 31, 2015 and PCT International Application No. PCT/KR2015/011421, filed on Oct. 28, 2015, the contents of which are all hereby incorporated by reference herein in their entirety.

TECHNICAL FIELD

The present invention relates to wireless communication and, more particularly, to a method of transmitting a reference signal for channel estimation of a non-linear self-interference signal in a full-duplex radio (FDR) environment and a communication device therefor.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE

Technical Problem

An object of the present invention is to provide a method of transmitting a reference signal for channel estimation of a non-linear self-interference signal at a communication device using an FDR scheme.

Another object of the present invention is to provide a communication device for transmitting a reference signal for channel estimation of a non-linear self-interference signal in an FDR environment.

The technical problems solved by the present invention are not limited to the above technical problems and other technical problems which are not described herein will become apparent to those skilled in the art from the following description.

Technical Solution

The object of the present invention can be achieved by providing a method of transmitting a reference signal for channel estimation of a non-linear self-interference signal by a communication device using a full duplex radio (FDR) scheme including transmitting reference signals for channel estimation of the non-linear self-interference signal on a specific symbol of a corresponding subframe, wherein a sequence mapped to the reference signals is subjected to discrete Fourier transform (DFT) and generated in a frequency domain, and wherein the generated sequence is mapped to a resource element (RE) for the reference signals in the frequency domain. The specific symbol may correspond to a fourth symbol of the corresponding subframe in a time-axis direction. The reference signals may be transmitted on the specific symbol of the corresponding subframe in full bandwidth. The reference signals may be transmitted on the specific symbol of the corresponding subframe in a specific band. If the reference signals are transmitted on the specific symbol of the corresponding subframe in the specific band, a reference signal which zero is inserted may be transmitted on the specific symbol of the subframe. The corresponding subframe may corresponds to a subframe index 0 or a subframe index 5.

In another aspect of the present invention, provided herein is a communication device for transmitting a reference signal for channel estimation of a non-linear self-interference signal in a full duplex radio (FDR) environment including a transmitter and a processor, wherein the processor controls the transmitter to transmit reference signals for channel estimation of the non-linear self-interference signal on a specific symbol of a corresponding subframe, wherein a sequence mapped to the reference signals is subjected to discrete Fourier transform (DFT) and generated in a frequency domain, and wherein the generated sequence is mapped to a resource element (RE) for the reference signals in the frequency domain. The specific symbol may correspond to a fourth symbol of the corresponding subframe in a time-axis direction. The processor may control the transmitter to transmit the reference signals on the specific symbol of the corresponding subframe in full bandwidth. The processor may control the transmitter to transmit the reference signals on the specific symbol of the corresponding subframe in a specific band. If the reference signals are transmitted on the specific symbol of the corresponding subframe in the specific band, the processor may control the transmitter to transmit a reference signal subjected to zero insertion on the specific symbol of the corresponding subframe. The corresponding subframe corresponds to a subframe index 0 or a subframe index 5.

Advantageous Effects

It is possible to efficiently perform channel estimation of a non-linear self-interference signal in an FDR environment according to a method of generating and transmitting a reference signal according to one embodiment of the present invention.

The effects of the present invention are not limited to the above-described effects and other effects which are not described herein may be derived by those skilled in the art from the following description of the embodiments of the present invention.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
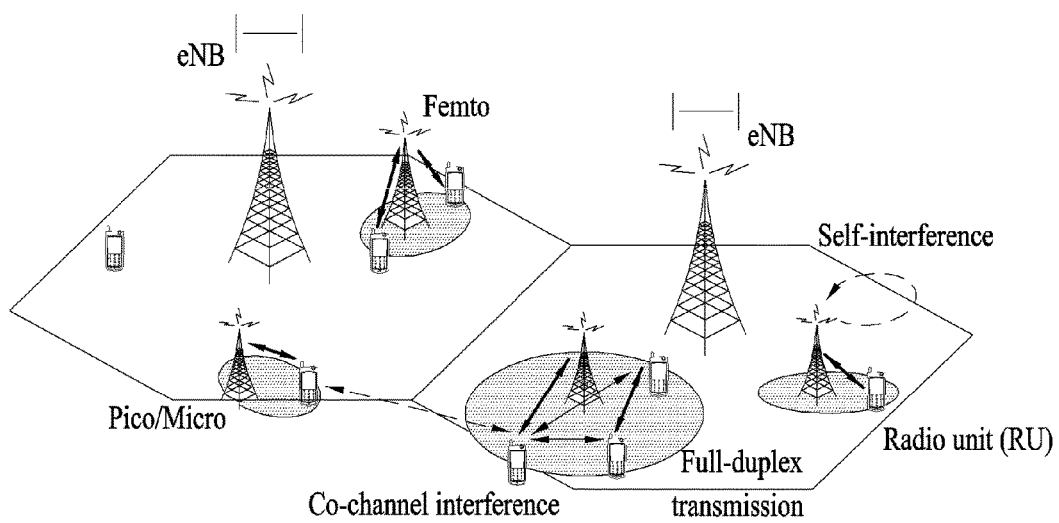
FIG. 1 is a diagram showing an exemplary network supporting a full-duplex/half-duplex communication method of a UE proposed by the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
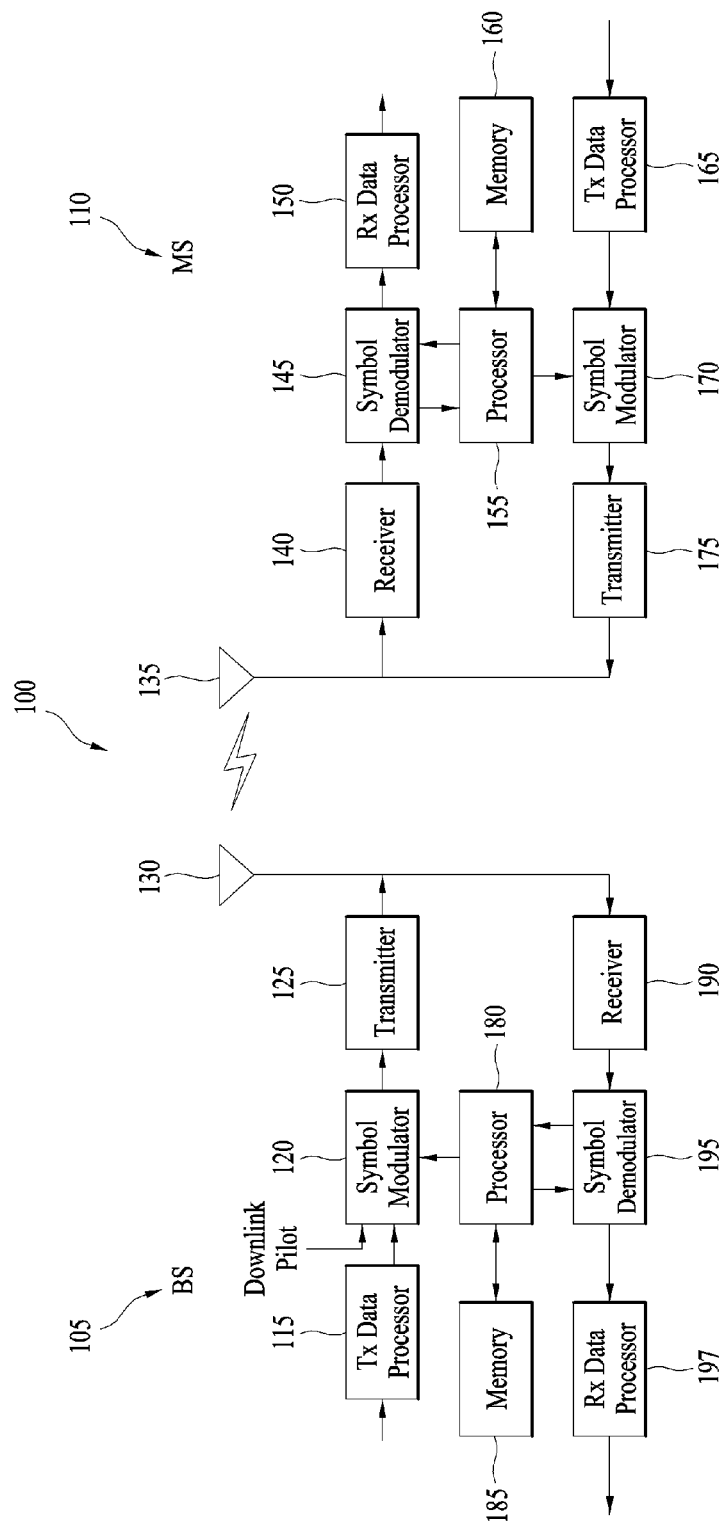
FIG. 2 is a block diagram for configurations of a base station 105 and a user equipment (UE) 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
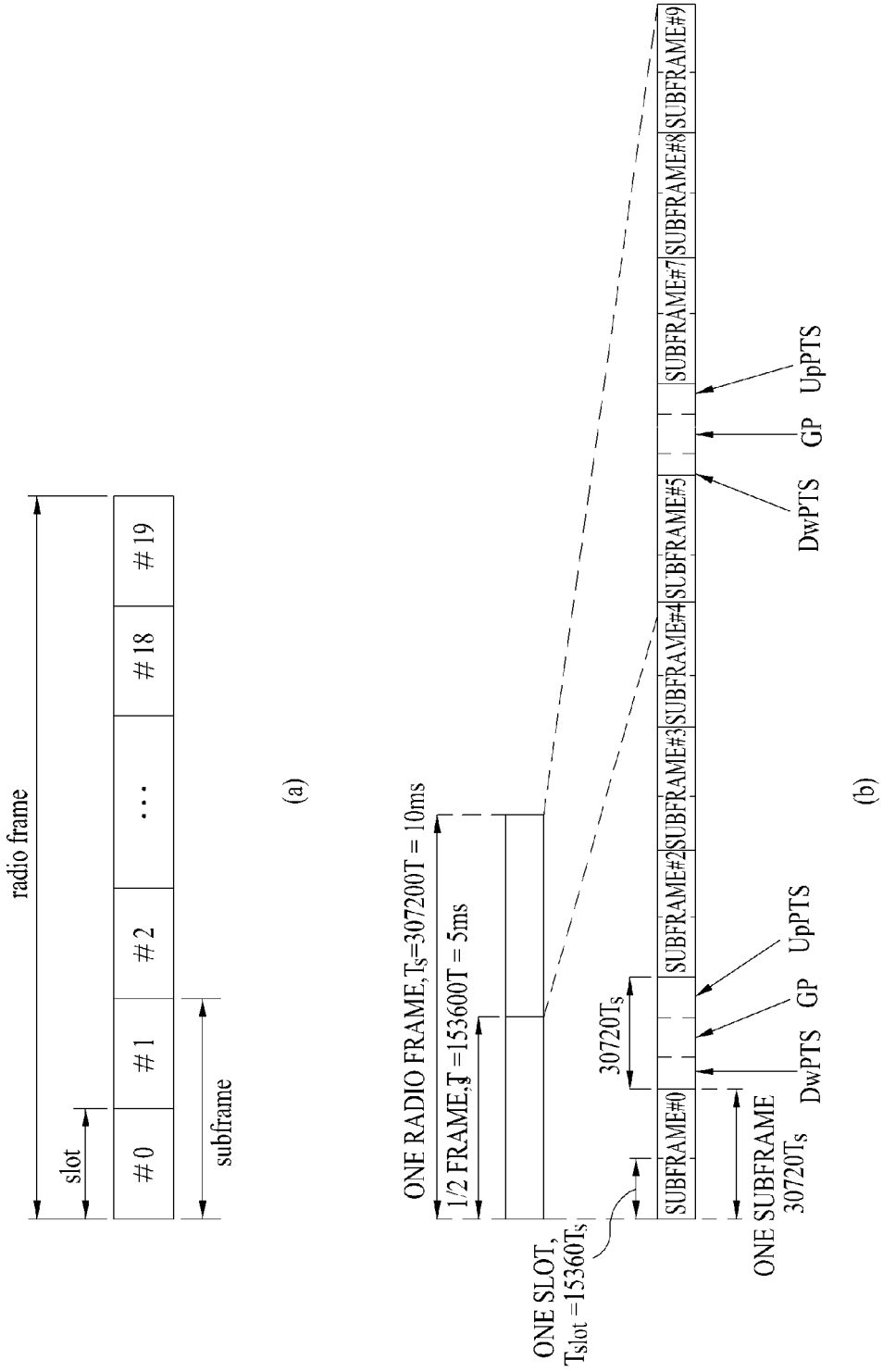
FIG. 3 is a diagram showing the structure of a radio frame used in a 3GPP LTE/LTE-A system which is an example of a wireless communication system.

FIG. 3 is a diagram showing the structure of a radio frame used in a 3GPP LTE/LTE-A system which is an example of a wireless communication system.

As a general wireless transmission method, for wireless transmission between a base station and a wireless user equipment (UE) as wireless devices, transmission from the base station to the wireless UE is referred to as downlink transmission and transmission from the wireless UE to the base station is referred to as uplink transmission. A scheme for dividing radio resources between downlink transmission and uplink transmission is defined as "duplex". Bidirectional transmission and reception in a state of dividing a frequency band into a downlink transmission band and an uplink transmission band is referred to as frequency division duplex (FDD) and transmission and reception in a state of dividing a time-domain radio resources into downlink time duration resources and uplink time duration resources in the same frequency band is referred to as time division duplex (TDD).

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 3(a) illustrates the type-1 radio frame structure. A downlink radio frame is divided into ten subframes. Each subframe includes two slots in the time domain. The time required to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first three OFDM symbols of each subframe may be allocated to a physical downlink control channel (PDCCH) and the other OFDM symbols may be allocated to a physical downlink shared channel (PDSCH).

FIG. 3(b) illustrates the type-2 radio frame structure.

The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in a base station and UL transmission synchronization in a UE. The GP is provided to cancel interference generated on UL due to multipath delay of a DL signal between DL and UL.

Each half frame includes 5 subframes, a subframe "D" is a subframe for downlink transmission, a subframe "U" is a subframe for uplink transmission, and a subframe "S" is a special subframe including a DwPTS (Downlink Pilot Time Slot), a guard period (GP) and a UpPTS (Uplink Pilot Time Slot). The DwPTS is used for initial cell search, synchronization, or channel estimation in a UE, whereas the UpPTS is used for channel estimation in a base station and UL transmission synchronization in a UE. The GP is provided to cancel interference generated in UL due to multipath delay of a DL signal between DL and UL.

The special subframe S is present in each half frame in the case of a 5-ms downlink-uplink switch-point period and is present only in a first half frame in the case of a 5-ms downlink-uplink switch-point period. Subframe indices 0 and 5 and DwPTS are used for only downlink transmission. A subframe immediately after the UpPTS and the special subframe is always used for uplink transmission. If multiple cells are aggregated, the UE may assume the same uplink-downlink configuration over all cells and the GPs of the special subframes in different cells overlap by at least 1456 Ts. The radio frame structures are merely examples, and various modifications may be made to the number of subframes included in a radio frame, the number of slots included in a subframe, or the number of symbols included in a slot.

[Table 1] below shows the configuration of the special frames (length of DwPTS/GP/UpPTS).

TABLE 1

| | Normal cyclic prefix in downlink | | | Extended cyclic prefix in downlink | | |
|---|---|---|---|---|---|---|
| | | UpPTS | | | UpPTS | |
| Special | | Normal | Extended | | | |
| subframe | | cyclic prefix | cyclic prefix | | Normal cyclic | Extended cyclic |
| configuration | DwPTS | in uplink | in uplink | DwPTS | prefix in uplink | prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |

TABLE 1-continued

| | | Normal cyclic prefix in downlink | | | Extended cyclic prefix in downlink | | |
|---|---|---|---|---|---|---|---|
| | | UpPTS | | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 7 | $21952 \cdot T_s$ | — | — | | — | — | — |
| 8 | $24144 \cdot T_s$ | — | — | | — | — | — |

[Table 2] below shows an uplink-downlink configuration in type-2 frame structure in a 3GPP LTE system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to [Table 2], in the 3GPP LTE system, there are seven uplink-downlink configurations in the type-2 frame structure. The location or number of downlink subframes, special frames or uplink subframes may be changed according to configuration. Hereinafter, various embodiments of the present invention will be described based on the uplink-downlink configurations of the type-2 frame structure shown in [Table 2].

Figure 4:
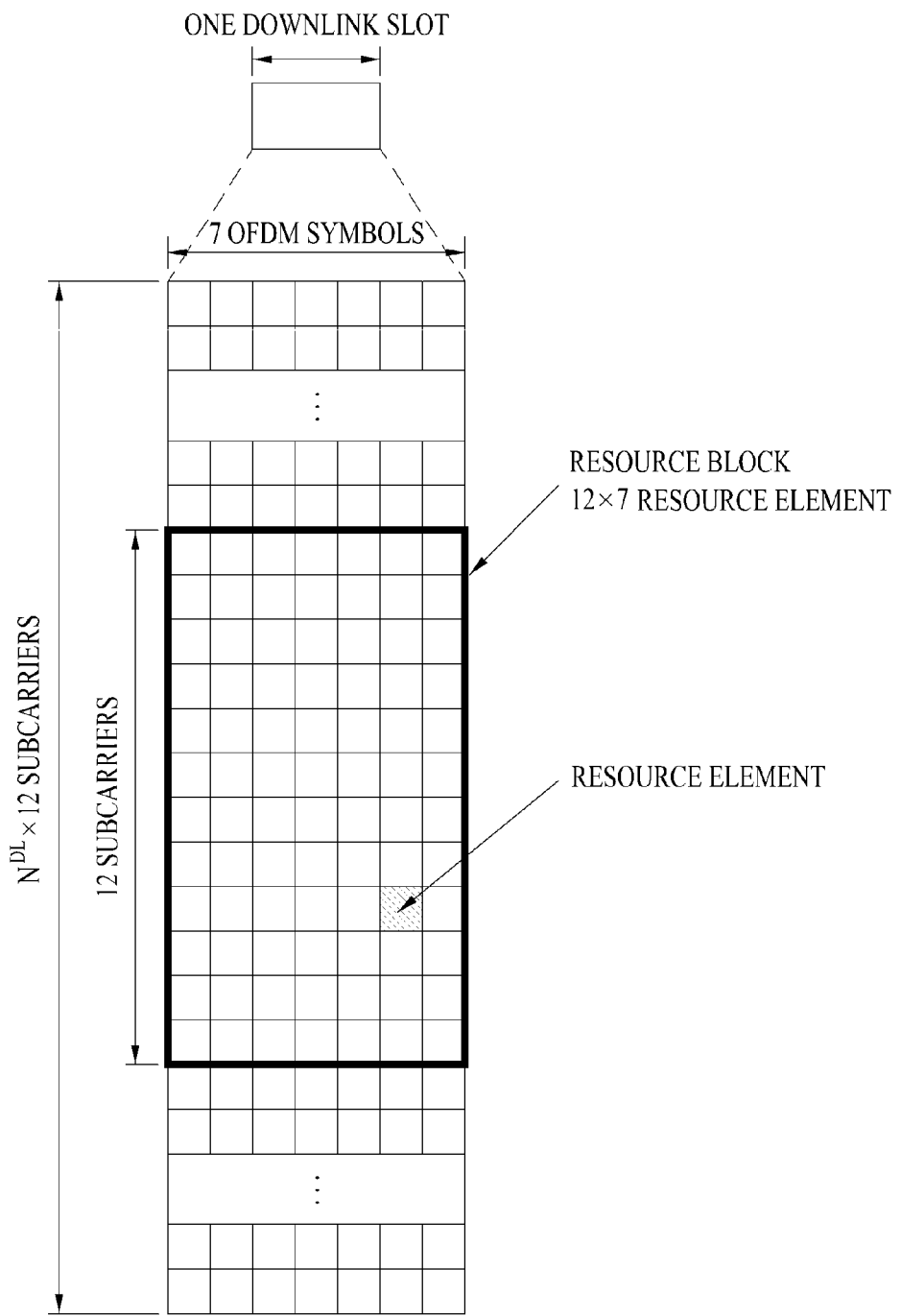
FIG. 4 is a diagram showing a resource grid of a downlink slot of a 3GPP LTE/LTE-A system which is an example of a wireless communication system.

FIG. 4 is a diagram showing a resource grid of a downlink slot of a 3GPP LTE/LTE-A system which is an example of a wireless communication system.

Referring to FIG. 4, a DL slot includes a plurality of OFDM symbols in the time domain. One DL slot includes 7 (or 6) OFDM symbols and an RB includes 12 subcarriers in the frequency domain. Each element of the resource grid is referred to as a Resource Element (RE). An RB includes 12×7(6) REs. The number NRB of RBs included in a DL slot depends on a DL transmission bandwidth. A UL slot may have the same structure as a DL slot, except that an OFDM symbol is replaced with an SC-FDMA symbol.

Figure 5:
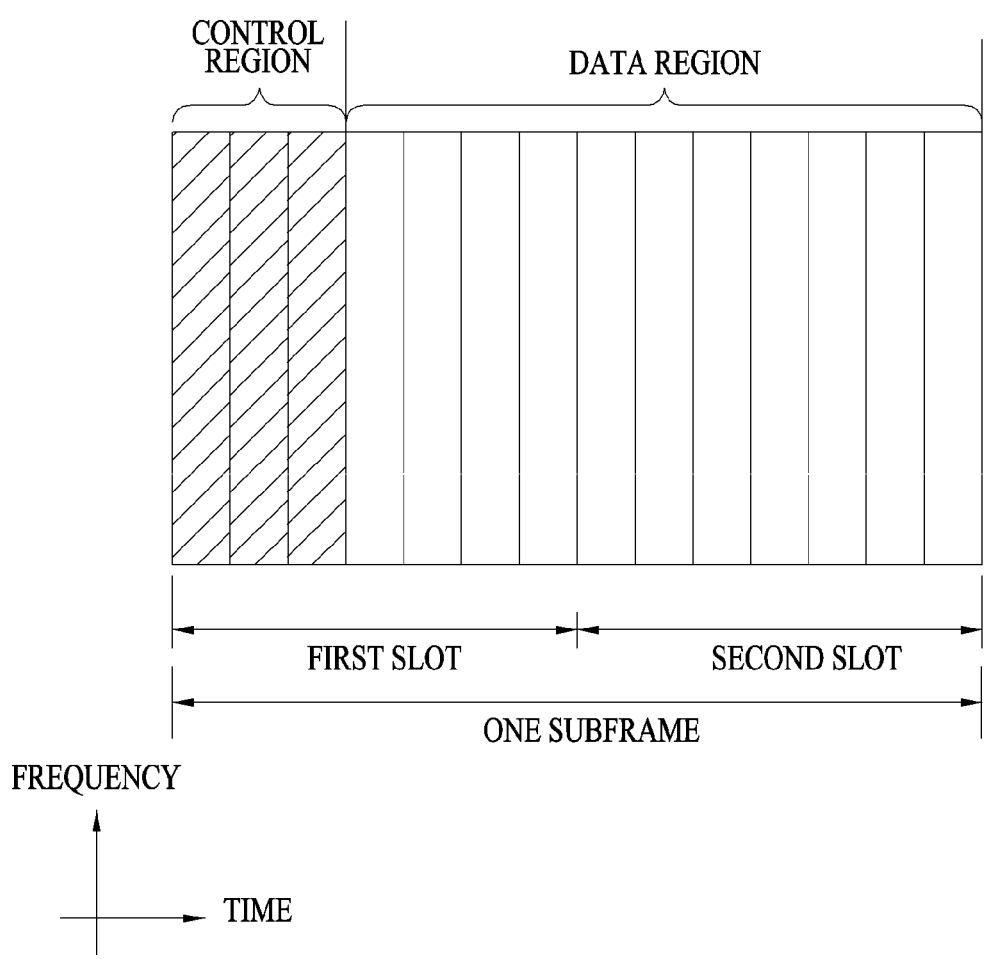
FIG. 5 is a diagram showing the structure of a downlink subframe used in a 3GPP LTE/LTE-A system which is an example of a wireless communication system.

FIG. 5 is a diagram showing the structure of a downlink subframe used in a 3GPP LTE/LTE-A system which is an example of a wireless communication system.

Referring to FIG. 5, a maximum of three (four) OFDM symbols located in a front portion of a first slot within a subframe corresponds to the control region to which a control channel is allocated. The remaining OFDM symbols correspond to the data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted on a first OFDM symbol of a subframe and carries information regarding the number of OFDM symbols used for transmission of control channels within the subframe. The PHICH is a response to uplink transmission and carries a HARQ acknowledgment (ACK)/negative acknowledgment (NACK) signal.

Control information carried on the PDCCH is called downlink control information (DCI). As a DCI format, format 0 for uplink and formats 1, 1A, 1B, 1C, 1D, 2, 2A, 3 and 3A for downlink are defined. The DCI format selectively includes a hopping flag, RB allocation, modulation coding scheme (MCS), redundancy version (RV), new data indicator (NDI), transmit power control (TPC), cyclic shift demodulation reference signal (DMRS), channel quality information (CQI) request, HARQ process number, transmitted precoding matrix indicator (TPMI), precoding matrix indicator (PMI) confirmation, etc. according to usage thereof.

The PDCCH may deliver information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, a Tx power control command, Voice Over Internet Protocol (VoIP) activation indication information, etc. A plurality of PDCCHs may be transmitted in the control region. The UE may monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). The format of the PDCCH and the number of PDCCH bits are determined according to the number of CCEs. The base station determines a PDCCH format according to DCI to be transmitted to the UE and attaches cyclic redundancy check to control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by an ID (e.g. a cell-RNTI (C-RNTI)) of the UE. If the PDCCH carries a paging message, the CRC may be masked by a paging ID (e.g. a Paging-RNTI (P-RNTI)). If the PDCCH carries system information, particularly, a System Information Block (SIB), the CRC may be masked by a system information ID (e.g. a System Information RNTI (SI-RNTI)). If the PDCCH is for a random access response, the CRC may be masked by a Random Access-RNTI (RA-RNTI).

Figure 6:
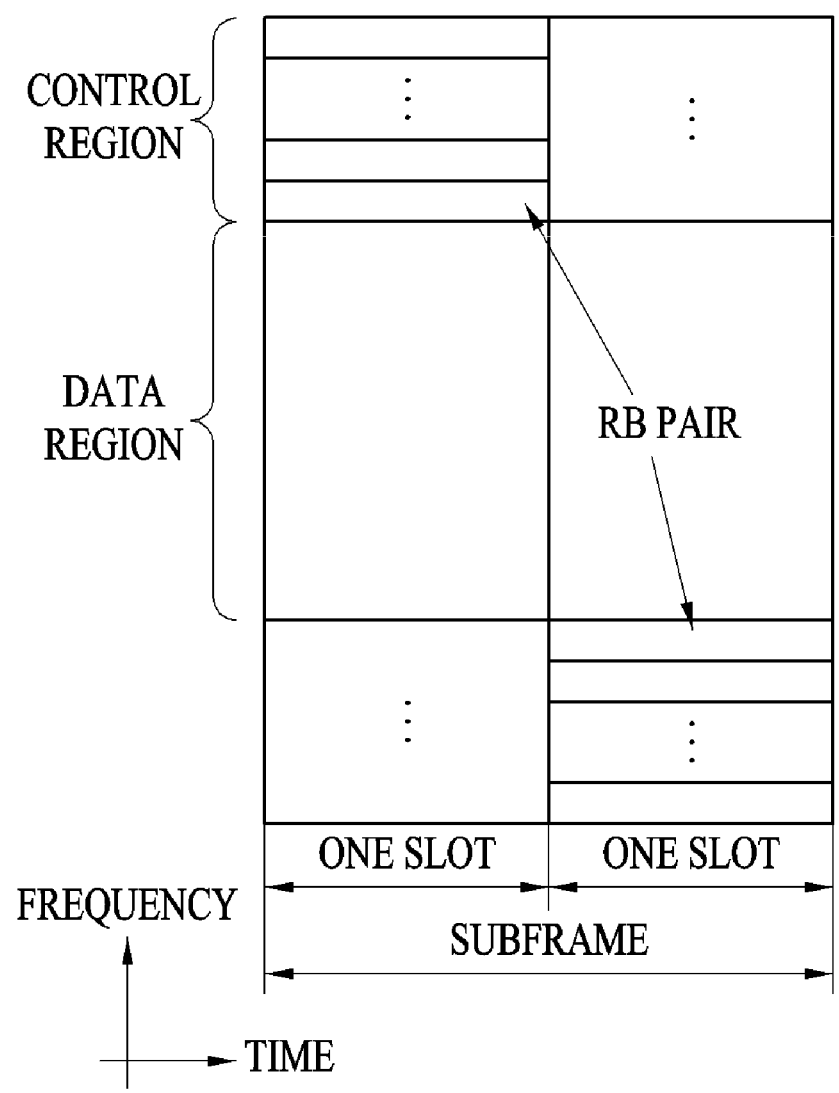
FIG. 6 is a diagram showing the structure of an uplink subframe used in a 3GPP LTE/LTE-A system which is an example of a wireless communication system.

FIG. 6 is a diagram showing the structure of an uplink subframe used in a 3GPP LTE/LTE-A system which is an example of a wireless communication system.

Referring to FIG. 6, the UL subframe includes a plurality (e.g., two) of slots. The slot may include SC-FDMA symbols, the number of which is changed according to CP length. The UL subframe is divided into a control region and a data region in the frequency domain. The data region includes a physical uplink shared channel (PUSCH) and is used to transmit a data signal such as voice. The control region includes a physical uplink control channel (PUCCH) and is used to transmit uplink control information (UCI). The PUCCH includes an RB pair located at both ends of the data region on the frequency axis and hops over a slot boundary.

The PUCCH can be used to transmit the following control information.

Scheduling Request (SR): This is information used to request a UL-SCH resource and is transmitted using an On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword (CW) and a 2-bit ACK/NACK signal is transmitted as a response to two downlink codewords.

Channel Quality Indicator (CQI): This is feedback information about a downlink channel. Feedback information regarding MIMO includes a rank indicator (RI), a precoding matrix indicator (PMI), a precoding type indicator (PTI), etc. 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports seven formats according to information transmitted thereon.

Figure 7:
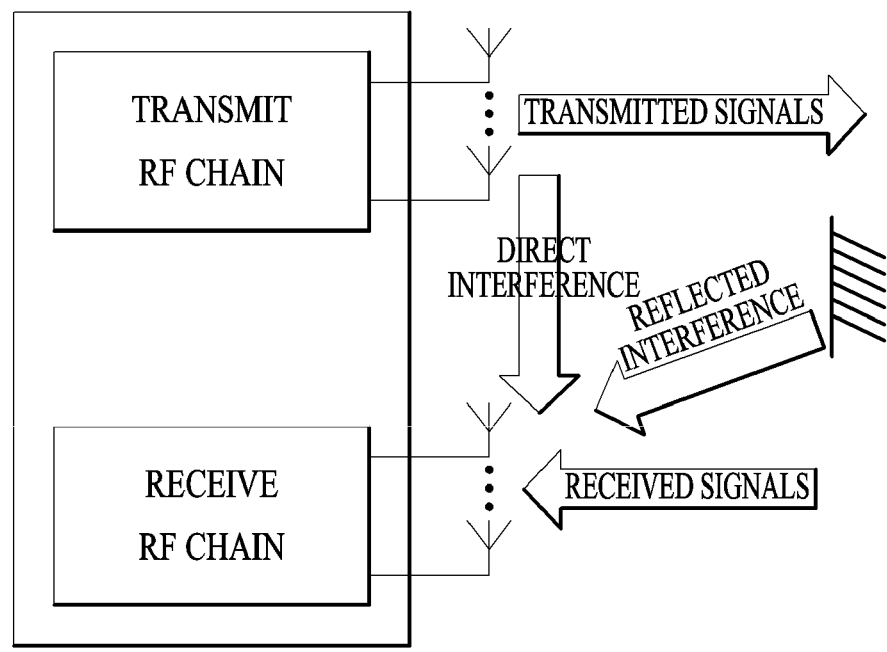
FIG. 7 is a diagram showing the concept of a transmission/reception link and self-interference (SI) in an FDR communication situation.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 3] below.

TABLE 3

| Node Type | Max. Tx Power ($P_A$) | Thermal Noise. (BW = 20 MHz) | Receiver NF | Receiver Thermal Noise Level | Self-IC Target ($P_A$- TN-NF) |
|---|---|---|---|---|---|
| Macro eNB | 46 dBm | −101 dBm | 5 dB (for eNB) | −96 dBm | 142 dB |

TABLE 3-continued

| Node Type | Max. Tx Power ($P_A$) | Thermal Noise. (BW = 20 MHz) | Receiver NF | Receiver Thermal Noise Level | Self-IC Target ($P_A$- TN-NF) |
|---|---|---|---|---|---|
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 3, it may be noted that to effectively operate the FDR system in a 20-MHz BW, a UE needs 119-dBm Self-IC performance. A thermal noise value may be changed to $N_{0,BW}$=−174 dBm+10×$\log_{10}$(BW) according to the BW of a mobile communication system. In Table 3, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 8:
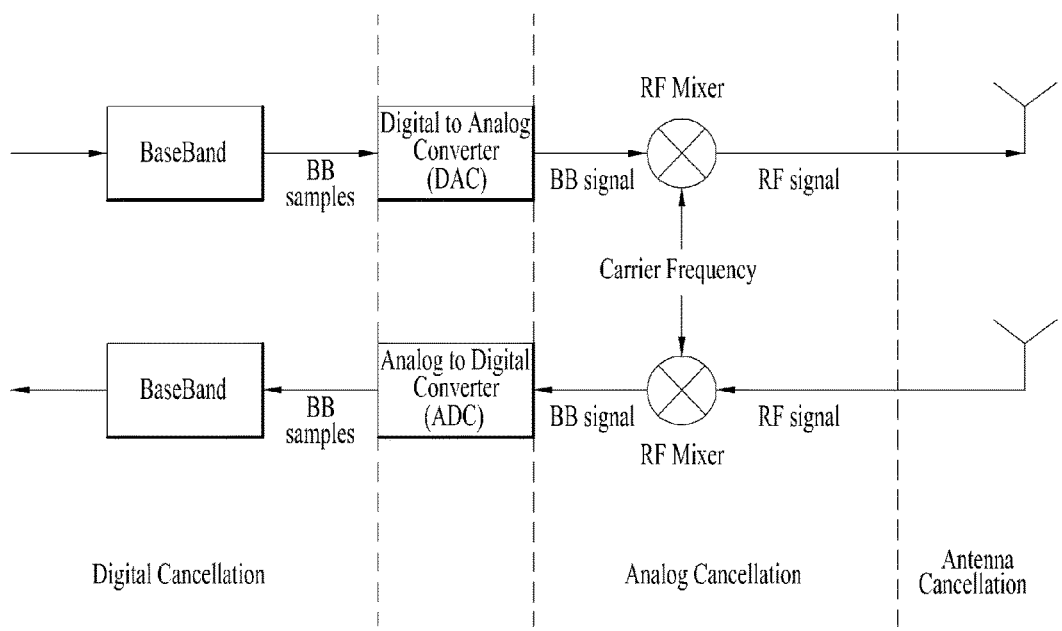
FIG. 8 is a view illustrating positions at which three Self-IC schemes are applied, at a Radio Frequency (RF) Tx and Rx end (or an RF front end) of a device.

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 9:
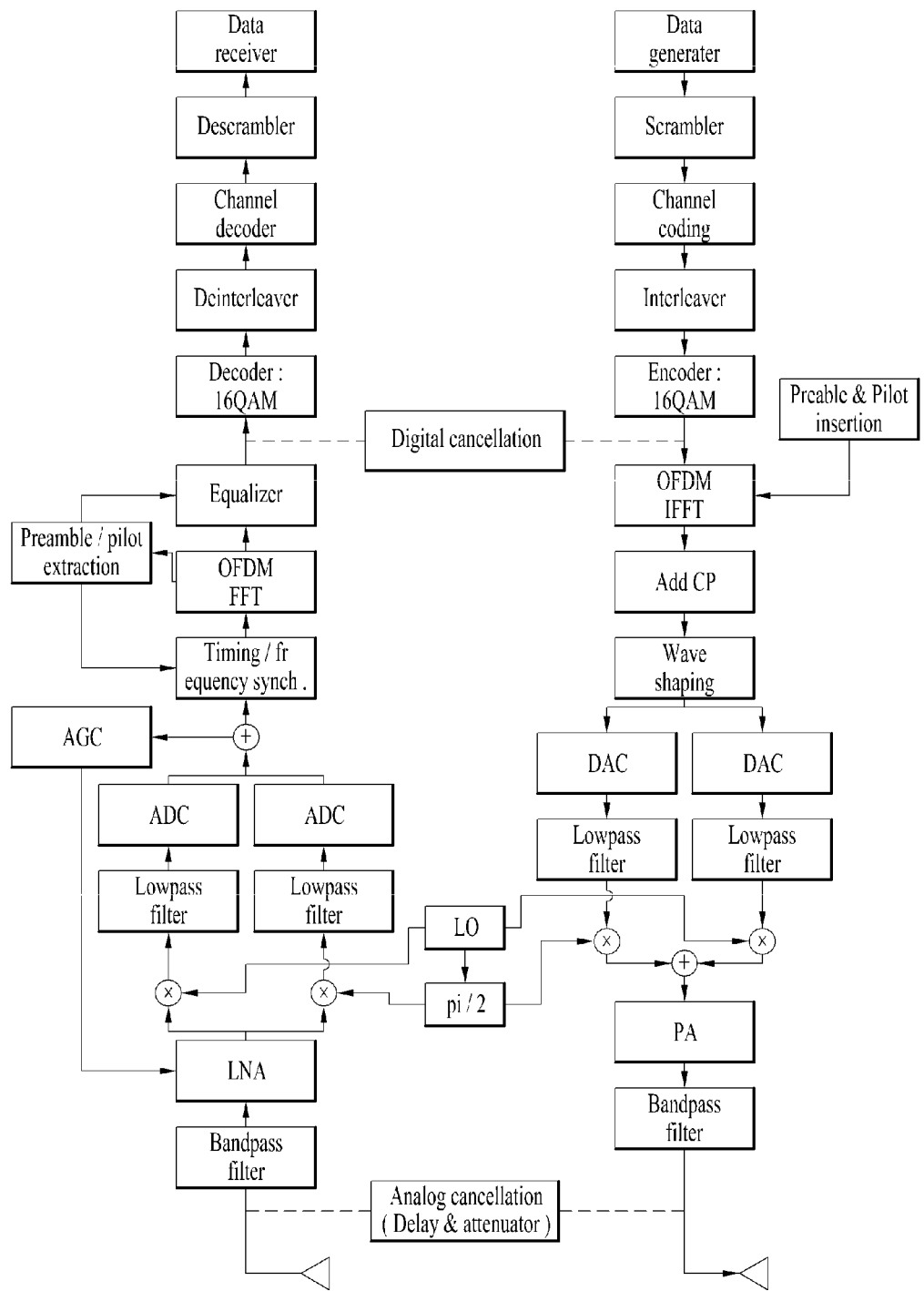
FIG. 9 is a block diagram of a Self-IC device in a proposed communication apparatus in an OFDM communication environment based on FIG. 8.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 9. A functional block may be added to or removed from an RF Tx end and an RF Rx end shown in FIG. 9 according to a purpose.

Signal Modeling of FDR System

Since an FDR system uses the same frequency between a transmitted signal and a received signal, non-linear components in an RF signal have significant influence. In particular, a transmitted signal is distorted by non-linear properties of active elements such as a power amplifier (PA) of a transmit RF chain and a low noise amplifier (LNA) of a receive RF chain, such distortion may be modified by a mixer in the transmit/receive RF chain, and, due to such distortion, the transmitted signal may be modeled as generation of a component corresponding to a high order. A component corresponding to an even order has influence on the vicinity of DC and a high frequency region corresponding to several multiples of a center frequency and thus may be efficiently cancelled using an existing AC coupling or filtering scheme. However, a component corresponding to an odd order is generated in the vicinity of a center frequency and thus cannot be easily cancelled unlike the even order, thereby having significant influence on reception. In consideration of the non-linear properties of the odd order, a received signal subjected to ADC in an FDR system may be expressed using the Parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n) \quad \text{[Equation 1]}$$

wherein k denotes an odd number, $x_{SI}[n]$ denotes data transmitted by an RF transmission end of the device, $h_{SI}[n]$ denotes gain of self-interference channel experienced by data transmitted by the RF transmission end, $x_D[n]$ denotes data to be received by an RF reception end of the device, $h_D[n]$ denotes gain of a desired channel experienced by data to be received by the RF reception end, and $z[n]$ denotes Additive White Gaussian Noise (AWGN). k=1 indicates a linear component and k having an odd number of 3 or more indicates a non-linear component.

The basic equation and properties of the Zadoff-Chu sequence will now be described.

A complex value of an n-th location (symbol or subcarrier) of a Zadoff-Chu sequence having a sequence length of Nzc, which is an odd number, and having a root value of u may be expressed as shown in Equation 2 below.

$$s_u[n] = \exp\left\{\frac{-j\pi un(n+1)}{N_{ZC}}\right\} \quad \text{[Equation 2]}$$

wherein 0<n<Nzc, 0<u<Nzc^gcd(Nzc, u)=1, and gcd(a,b) denotes a function indicating the greatest common denominator of two integers a and b.

The basic properties of the Zadoff-Chu sequence will now be described.

1) The Zadoff-Chu sequence has a periodic property by Nzc if Nzc is an odd number. The equation thereof is as shown in Equation 3 below.

$$(s_u[n+N_{ZC}]=s_u[n]) \quad \text{[Equation 3]}$$

2) If Nzc is a prime number, DFT of the Zadoff-Chu sequence is scaled to obtain a time-scaled conjugated Zadoff-Chu sequence.

$(s_u[k]=s_u*[ũk]s_u[0]$, where $ũ$ is the multiplicative inverse of $u$ modulo $N_{ZC}$)

3) Autocorrelation between the Zadoff-Chu sequence and a cyclic-shifted sequence has a value of 0 and the equation thereof is as shown in Equation 4 below.

$$R_{s_u}(k) = \sum_{n=1}^{N_{ZC}-1} s_u[n]s_u^*[(n-k)_{N_{ZC}}] = \begin{cases} N_{ZC}, & k=0 \\ 0, & k \neq 0 \end{cases} \quad \text{[Equation 4]}$$

4) Two Zadoof-Chu sequences having root values of $u_1$ and $u_2$, in which $|u_1-u_2|$ is relatively prime to Nzc, have a cross correlation value of $$\frac{1}{\sqrt{N_{ZC}}}$$

and the equation thereof is as shown in Equation 5 below.

$$C_{s_{u_1}u_2} = \left|\sum_{n=1}^{N_{ZC}-1} s_{u_1}[n]s_{u_2}^*[n]\right| \quad \text{[Equation 5]}$$

$$= \begin{cases} \frac{1}{\sqrt{N_{zc}}}, & gcd(N_{ZC}|u_1-u_2|)=1 \\ \text{Not Available}, & gcd(N_{ZC}|u_1-u_2|)>1 \end{cases}$$

Necessity of Non-Linear Self-Interference Cancellation Scheme Using Sequence

A non-linear self-interference channel is necessary for efficient self-interference cancellation using FDR. However, a Least Square (LS) Estimation method used for self-interference channel estimation requires matrix inversion. Such matrix inversion requires high-complexity computation and causes a problem upon implementation corresponding to matrix inversion generation according to matrix size. More specifically, when the number of multi-path taps or the order corresponding to non-linearity to be estimated for operation of FDR increases, a matrix size for inversion increases according to increase in order and number of taps, and complexity of matrix inversion increases to the cube of the matrix size, such that implementation is impossible.

In order to overcome high complexity of non-linear self-interference channel estimation and implementation impossibility, a method of using a sequence for non-linear self-interference channel estimation is proposed. More specifically, the high-order component of the self-interference channel modelled in Equation 1 may be estimated with low complexity using the cross-correlation property of the sequence and implementation thereof is simpler than matrix inversion. In addition, an extended scheme for estimating a multi-path component corresponding to each order as well as a high-order component of a self-interference channel using the auto-correlation property and cross correlation property of the sequence is proposed. This scheme may also perform self-interference estimation with low complexity.

In the scheme for estimating the high-order component of the self-interference channel using the cross-correlation property of the sequence and the extended scheme for estimating the multi-path component corresponding to each order as well as the high-order component of a self-interference channel using the auto-correlation property and cross correlation property of the sequence, even when the number of multi-path taps and the order corresponding to non-linearity to be estimated for operation of FDR increase, complexity linearly increases. Therefore, as compared to existing methods, complexity is remarkably reduced and implementation is possible. That is, non-linear self-interference cancellation with low complexity is possible through non-linear self-interference channel estimation using the sequence.

Necessity of Non-Linear Self-Interference Channel Estimation in Time Domain Considering Inter-Modulation Distortion (IMD) Component Generated Due to Non-Linearity of PA Meanwhile, in a legacy LTE system, when an RS for channel estimation is configured, in order to improve resource efficiency, RS signals such as a common RS (CRS), a channel state information reference signal (CSI-RS) and a demodulation reference signal DM-RS are allocated at a predetermined interval in the time and frequency domain. Thereafter, various 1D or 2D interpolation schemes (block interpolation, linear interpolation, non-linear interpolation, etc.) may be applied based on a demodulated reference signal symbol (or pilot signal symbol), thereby performing channel estimation. However, in the FDR system, an inter-modulation distortion (IMD) component which is a non-linear component is included in a self-interference signal due to non-linearity of a device. Therefore, when existing interpolation schemes are applied, the IMD component is not considered and thus non-linear self-interference channel estimation is impossible and a non-linear self-interference channel estimation scheme considering a non-linearity property is necessary.

Influence of IMD in the FDR system will now be described. First, IMD may be generated due to non-linearity of the device. This means that an odd-term component of a high-order component of a signal is generated in the vicinity of a transmitted signal.

Figure 10:
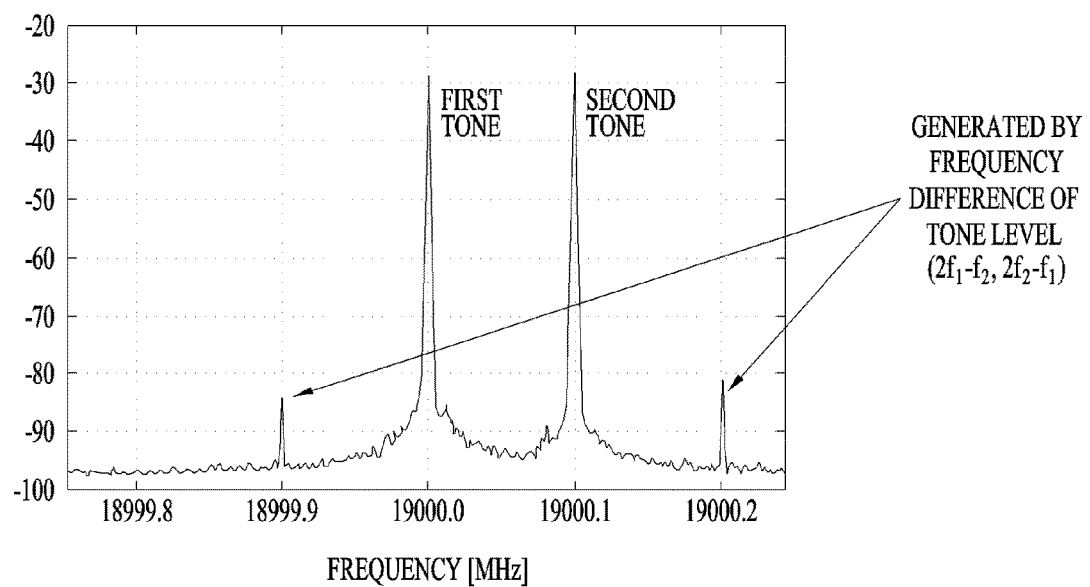
FIG. 10 experimentally shows IMD of a third-order component generated in an adjacent frequency band upon two-tone transmission having a difference of 1 kHz between 1900 MHz and 19000.1 MHz of OFDM signals.

FIG. 10 experimentally shows IMD of a third-order component generated in an adjacent frequency band upon two-tone transmission at 19000.0 MHz and 19000.1 MHz having a difference therebetween of 1 kHz among OFDM signals.

As shown in FIG. 10, it can be seen that, upon two-tone transmission, due to a third-order IMD component, IMD may be generated at 18999.9 MHz and 19000.2 MHz which are positions separated by the frequency difference between the tones transmitted at both two-tone ends. Based on the above result, IMD generated in multi-tone transmission of OFDM is expressed as shown in FIG. 11 and FIG. 12.

Figure 11:
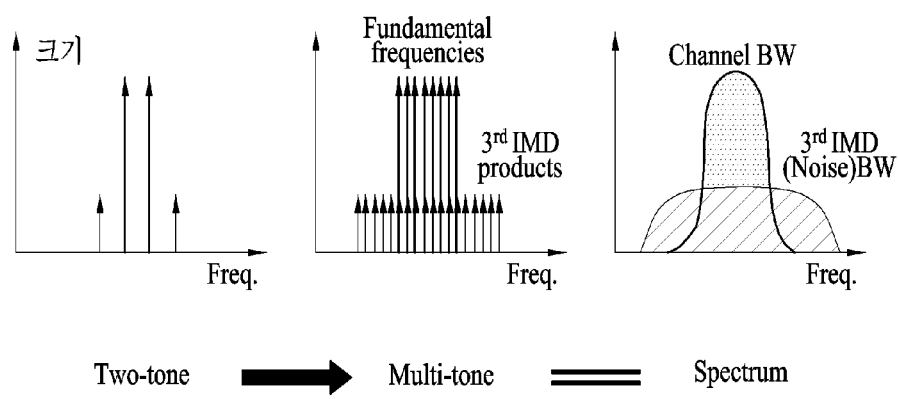
FIG. 11 is a diagram showing a third-order IMD component upon multi-tone transmission.
Figure 12:
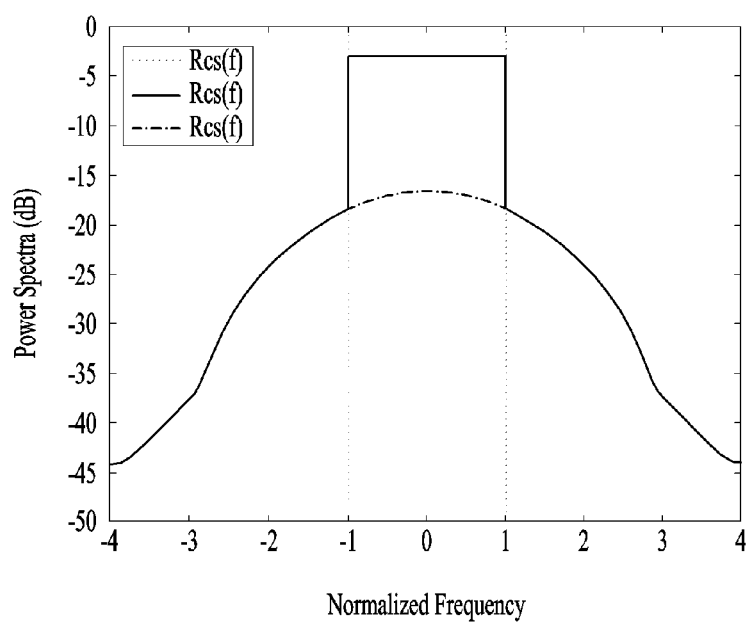
FIG. 12 is a diagram showing power spectral density (dB) including IMD in an OFDM based system.

FIG. 11 is a diagram showing a third-order IMD component upon multi-tone transmission, and FIG. 12 is a diagram showing power spectral density (dB) including IMD in an OFDM based system.

As shown in FIG. 11, upon multi-tone transmission, since the number of generated IMD components exponentially increases according to the number and interval of transmitted tones, the IMD components generated by the tones are measured and modelled, for modelling of the IMD components in the frequency domain, thereby increasing complexity. For example, by 3GPP LTE, a total of 1200 OFDM subcarriers is transmitted upon transmission with bandwidth of 20 MHz. At this time, since 719400 (1200×1199/2) IMD components are generated, modelling these IMD components in the frequency domain is complex and estimation of the IMD components in the frequency domain is impossible. Therefore, for estimation of a non-linear self-interference channel in an FDR system, it is necessary to model and estimate a self-interference channel in the time domain.

Proposal 1

A method of generating a sequence in the frequency domain such that the auto-correlation and cross-correlation properties of the sequence are valid in the time domain and mapping the sequence to an RS is proposed.

In a PN sequence or a Zadoff-Chu sequence used in a legacy 3GPP LTE system, data of the sequence is arranged in the frequency domain. However, as described above, when data of the sequence is allocated to the frequency domain as in legacy 3GPP LTE, interference is generated due to a high-order IMD component of a self-interference signal and the auto-correlation and cross-correlation properties of the sequence are influenced. In addition, in the 3GPP LTE system, data of the frequency domain is converted into data of the time domain through IFFT operation upon transmission. At this time, a Zadoff-Chu sequence is also subjected to IFFT. The auto/cross correlation property of the sequence in the time domain to be obtained by transmitting a Zadoff-Chu sequence differently time-scaled whenever the root value is changed by the second property of the Zadoff-Chu sequence (if the length $N_{ZC}$ of the Zadoff-Chu sequence is a prime number, a result of performing DFT is scaled to become a time-scaled conjugated Zadoff-Chu sequence $(s_u[k]=s_u^*[\tilde{u}k]s_u[0]$, where $\tilde{u}$ is the multiplicative inverse of u modulo $N_{ZC}$) may not be obtained as designed. For example, if u=2 and $N_{ZC}$=61, $\tilde{2}$ is defined by an x value of 2×x≡1 (mod 61), and an equation for satisfying this is 2×31≡62 (mod 61)≡1 and thus $\tilde{u}$=31. Upon substituting this into the above equation, time scaling is performed by 31 as in $S_2[k]=s_2^*[31\times k]S_2[0]$ and $S_2[0]$-scaled conjugated sequence is obtained.

Therefore, in order to obtain the auto/cross correlation property of the sequence in the time domain as designed, the sequence is pre-subjected to DFT operation or the sequence is generated and used in the frequency domain to perform DFT operation.

In this proposal, a method of designing a sequence in the frequency domain and performing resource allocation such that the auto/cross-correlation property of the sequence is obtained in the time domain in order to perform non-linear self-interference channel estimation in the time domain in the FDR system is included. Through this proposal, the sequence is generated such that non-linear self-interference cancellation is possible in the time domain and resource allocation is performed in a block type in the frequency domain. Therefore, the auto/cross correlation property is maintained in the time domain even in the non-linear self-interference channel environment and non-linear self-interference channel estimation is possible using this property. In this proposal, a procedure of storing a sequence as a result of performing DFT with respect to the sequence or generating a sequence in the frequency domain to perform DFT operation of the sequence and allocating the sequence to the resources of the frequency domain is included.

Various embodiments of Proposal 1 will now be described.

Proposal 1-1: Method of Pre-Performing DFT with Respect to a Sequence to be Transmitted and Mapping this Value to an RS of the Frequency Domain As described above, a Zadoff-Chu sequence having a desired length in the time domain of $N_{zc}$ and a root value of u is generated as shown in Equation 6 below and is subjected to DFT of $N_{ZC}$ point.

$$S_u[k] = \sum_{n=0}^{N_{zc}} s_u[n] e^{-\frac{2\pi i k n}{N_{ZC}}}$$ [Equation 6]

The sequence generated as shown in Equation 6 is mapped to the RE allocated to each RS. The RS mapping method will be described below.

Proposal 1-2: A sequence value of the frequency domain subjected to DFT based on a sequence is generated with low complexity through conjugate operation and scalar multiplication operation ($S_u[k]=s_u^*[ũk]S_u[0]$).

In the method of Proposal 1-1, a Zadoff-Chu sequence generated in legacy 3GPP LTE is subjected to DFT and then is used. However, the following two problems may be generated upon performing DFT operation.

1. Upon performing DFT operation, a complexity problem is generated in proportion to the length ($N_{ZC}$) of the sequence. Since a DFT size which may be used in legacy LTE is in the form of radix of 2, 3 or 5 ($2^{k_1} \times 3^{k_2} \times 5^{k_3}$, where $k_1, k_2, k_3$ are integers), distortion is generated.

2. If the sequence subjected to DFT is stored and used, since the root vale of the sequence which DFT operation is performed in legacy LTE system is (# of root value)×(# of cyclic shift), much additional memory for storing sequences is required.

Since the above problems may be generated, a sequence subjected to DFT may be immediately generated and used based on the below-described proposal.

A result of performing DFT with respect to Equation 5 which is a Zadoff-Chu sequence having a length of $N_{zc}$ and a root value of u may be expressed as shown in Equation 7 below.

$$S_u[k] = \sum_{n=0}^{N_{ZC}} s_u[n] e^{-\frac{2\pi i k n}{N_{ZC}}}$$ [Equation 7]

$$= \sum_{n=0}^{N_{ZC}} e^{-\frac{\pi i u n(n+1)}{N_{ZC}}} e^{-\frac{2\pi i k n}{N_{ZC}}}$$

$$= s_u^*[ũk]S_u[0],$$

wherein $S_u[0]$ denotes a constant and ũ is modulo multiplicative inverse u mod $N_{ZC}$.

A result of performing DFT with respect to a Zadoff-Chu sequence having a length of $N_{zc}$, a root value of u and cyclic shift of p may be expressed as shown in Equation 8 below.

$$S_{u,p}[k] = \sum_{n=0}^{N_{ZC}} s_{u,p}[n] e^{-\frac{2\pi i k n}{N_{ZC}}}$$ [Equation 8]

$$= \sum_{n=0}^{N_{ZC}} e^{-\frac{\pi i u(n+p)(n+p+1)}{N_{ZC}}} e^{-\frac{2\pi i k n}{N_{ZC}}}$$

$$= s_u^*[ũk+p]s_u[p]S_u[0].$$

A sequence subjected to DFT through conjugate and scalar multiplication operation based on Equation 7 and Equation 8 may be generated and, if the sequence is mapped to an RS in the frequency domain, a Zadoff-Chu sequence having a length of $N_{zc}$, a root value of u and cyclic shift of p is transmitted in the time domain and non-linear self-interference channel estimation using the auto-correlation/cross-correlation property of the sequence is possible.

Embodiment of Generating Base Sequence Considering Compatibility with 3GPP LTE

For example, $r_{u,v}(n)$, which is the base sequence of the reference signal sequence in 3GPP LTE, is defined as shown in Equation 9 below.

$$r_{u,v}(n) = x_q(n \mod N_{ZC}^{RS}), 0 \leq n \leq M_{sc}^{RS}$$ [Equation 9]

wherein u denotes a sequence group number, v denotes a base sequence number in a group, and $M_{sc}^{RS}$ denotes the length of a reference signal sequence. In addition, a Zadoff-Chu sequence having a q-th root is defined as $$x_q(m) = e^{-j\frac{\pi q m(m+1)}{N_{ZC}^{RS}}}, 0 \leq m \leq N_{ZC}^{RS} - 1 \text{ and}$$

$$q = \lfloor \bar{q} + 1/2 \rfloor + v \cdot (-1)^{\lfloor 2\bar{q} \rfloor}, \bar{q} = N_{ZC}^{RS} \cdot (u+1)/31, N_{ZC}^{RS}$$

is a largest prime numberless than $M_{sc}^{RS}$, and indicates the length of the Zadoff-Chu sequence.

Here, in order to generate the base sequence for non-linear self-interference channel estimation of the FDR scheme, instead of $x_q(m)$ of Equation 9, $x_q^*[\tilde{q}m]X_q[0]$ of Equation 7 or $x_q^*[\tilde{q}m+v]x_q[v]X_q[0]$ of Equation 8 is inserted into Equation 9, thereby generating a changed base sequence as shown in Equation 10 below.

$$r_{u,v}(n) = x_q^*[\tilde{q}n \mod N_{ZC}^{RS}]X_q[0], 0 \leq n \leq M_{sc}^{RS}$$

$$r_{u,v}(n) = x_q^*[\tilde{q}n \mod N_{ZC}^{RS}+v]x_q[v]X_q[0], 0 \leq n \leq M_{sc}^{RS}$$ [Equation 10]

wherein q which is the root value may be different from the above-defined value.

In addition, the sequence generated by Equation 9 may be generated as base sequence by performing DFT operation using Equation 7 and Equation 8, thereby generating a base sequence.

Proposal 2: Method of Allocating RS in Block Type for Non-Linear Self-Interference Channel Estimation in FDR System For RS resource allocation enabling non-linear self-interference cancellation based on the sequence of Proposal 1, an RS is configured or allocated in a block type over the full bandwidth. When an RS is not allocated to the full bandwidth but is allocated to some sub-bands and data (e.g., PDSCH) or a control signal (control channel) (e.g., e-PDCCH), which is not an RS, is allocated to the other bands, an IMD component generated by the data or control signal, which is not the RS, causes interference with the RS signal and estimation of a high-order component becomes impossible upon non-linear self-interference channel estimation. The root value of the sequence is allocated in order to estimate IMD, but an IMD interference component of the data or control signal greater than a signal to be estimated is generated and is not identified by the sequence and thus a non-linear component may not be estimated. Therefore, for non-linear self-interference channel estimation for the FDR scheme, allocation of RS resource over the full bandwidth in a block type is necessary. There are various allocation methods in association with RS resource allocation.

Proposal 2-1: Method of Allocating RS Resources in Block Type Using Symbols Including Full Bandwidth in Order to Apply Proposed Sequence As described above, in order to estimate a non-linear self-interference signal, interference between IMD components should not be generated. To this end, transmission of another signal is not performed upon transmitting the RS for non-linear self-interference estimation. Accordingly, RS resources may be allocated in a block type over the full bandwidth.

Figure 13:
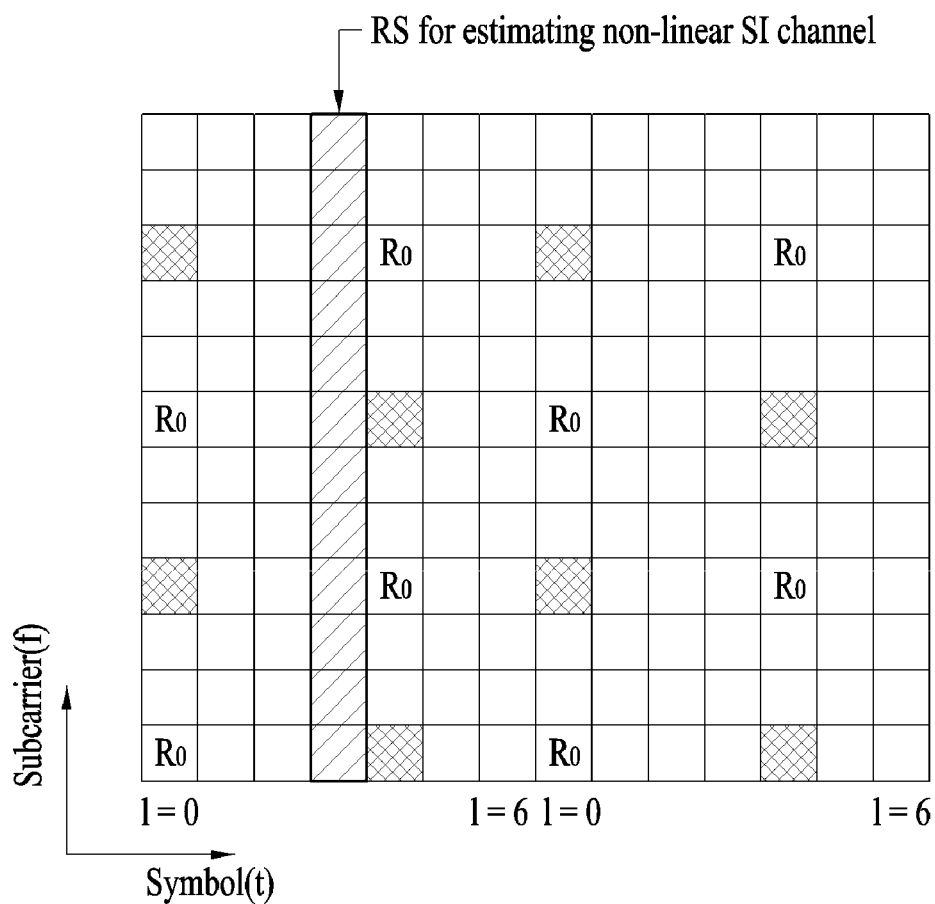
FIG. 13 shows an example of RS allocation of a block type upon downlink transmission based on a 3GPP LTE/LTE-A system.

FIG. 13 shows an example of RS allocation of a block type upon downlink transmission based on a 3GPP LTE/LTE-A system.

Referring to FIG. 13, for non-linear self-interference signal estimation in an FDR environment, an RS may be allocated to a fourth symbol in the subframe. However, this is merely exemplary and an RS for estimating or cancelling a non-linear self-interference signal in an FDR environment may be allocated using a symbol different from the fourth symbol shown in FIG. 13. Although an RS for estimating a non-linear self-interference signal is allocated to one symbol (e.g., fourth symbol) in the subframe in FIG. 13, this is merely exemplary and an RS for estimating a non-linear self-interference signal may be allocated to one or more symbols in the subframe, which will be described below.

Embodiment 2-1

For example, in downlink of 3GPP LTE/LTE-A, in the case of system bandwidth of 1.4 MHz, an RS for non-linear self-interference cancellation in an FDR environment may be allocated to a fourth symbol of a first subframe of each frame as shown in FIG. 13 in consideration of compatibility with a legacy system. In addition, in the case of system bandwidths of 3 MHz, 5 MHz, 10 MHz and 20 MHz, an RS allocation structure having system bandwidth of 1.4 MHz may be extended to the frequency domain and allocated in consideration of compatibility with the legacy system.

Figure 14:
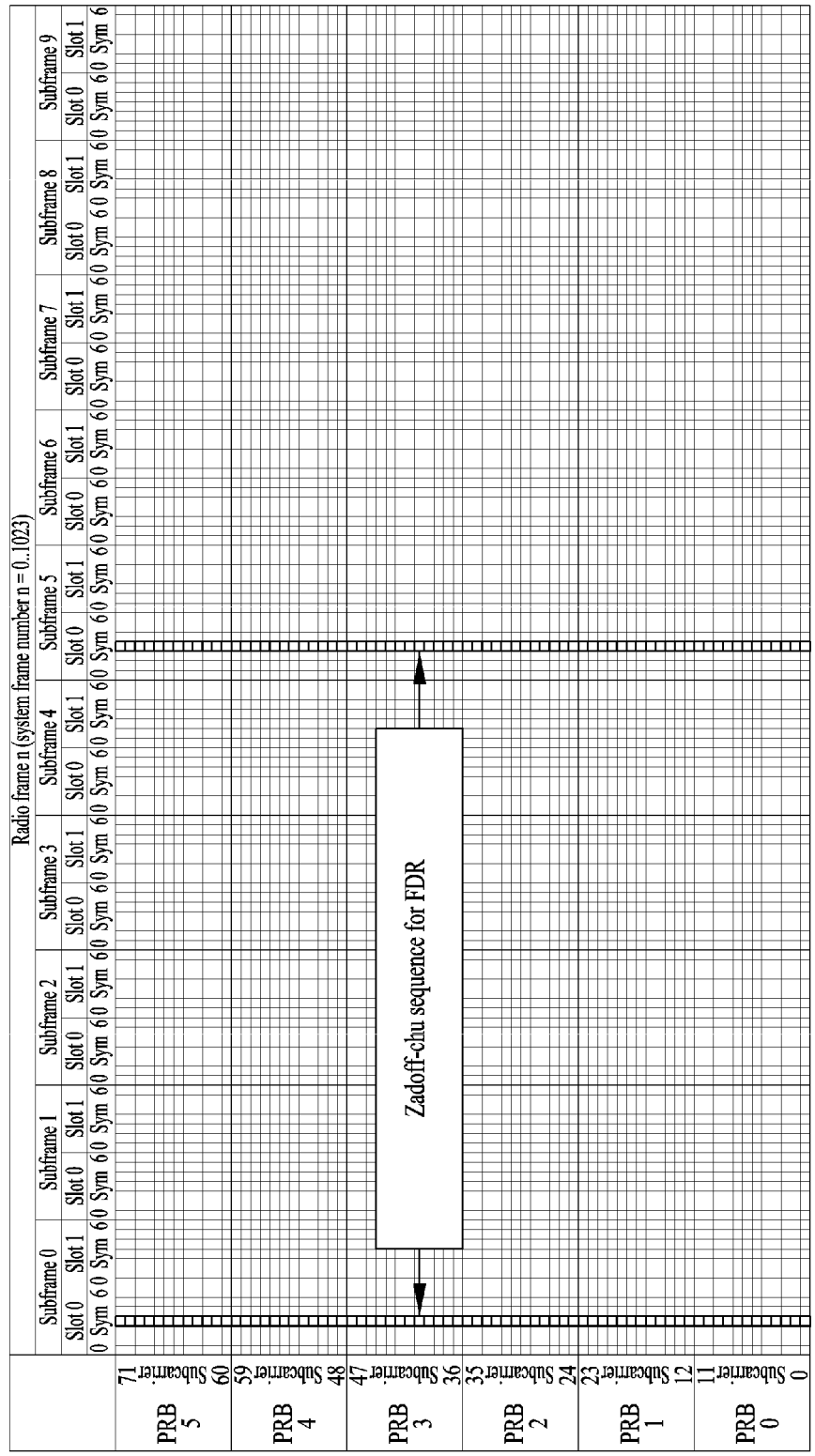
FIG. 14 shows an example of block-type RS allocation for (channel) estimation of a non-linear self-interference signal on downlink in a 3GPP LTE/LTE-A system.

FIG. 14 shows an example of block-type RS allocation for (channel) estimation of a non-linear self-interference signal on downlink in a 3GPP LTE/LTE-A system.

Referring to FIG. 14, an RS for non-linear self-interference signal estimation or cancellation in an FDR environment may be allocated using symbols other than the fourth symbols of subframe 0 and subframe 5 or symbols of another subframe.

Proposal 2-2: Method of Allocating RS Resources in Block Type to Include Some Frequency Bands in Order to Apply Proposed Sequence As described above, if an RS is transmitted over the full bandwidth, from the viewpoint of performance of non-linear self-interference channel estimation, channel estimation of the full bandwidth is possible, thereby obtaining good performance. However, if transmit power is restricted as in a UE, a problem may be generated upon transmitting an RS in the full bandwidth. In addition, when transmission and reception are performed using some frequency bands upon FDR transmission, estimation of the full bandwidth may be unnecessary. In this case, RS resources may be allocated in a block type to selectively include some frequency bands.

Figure 15:
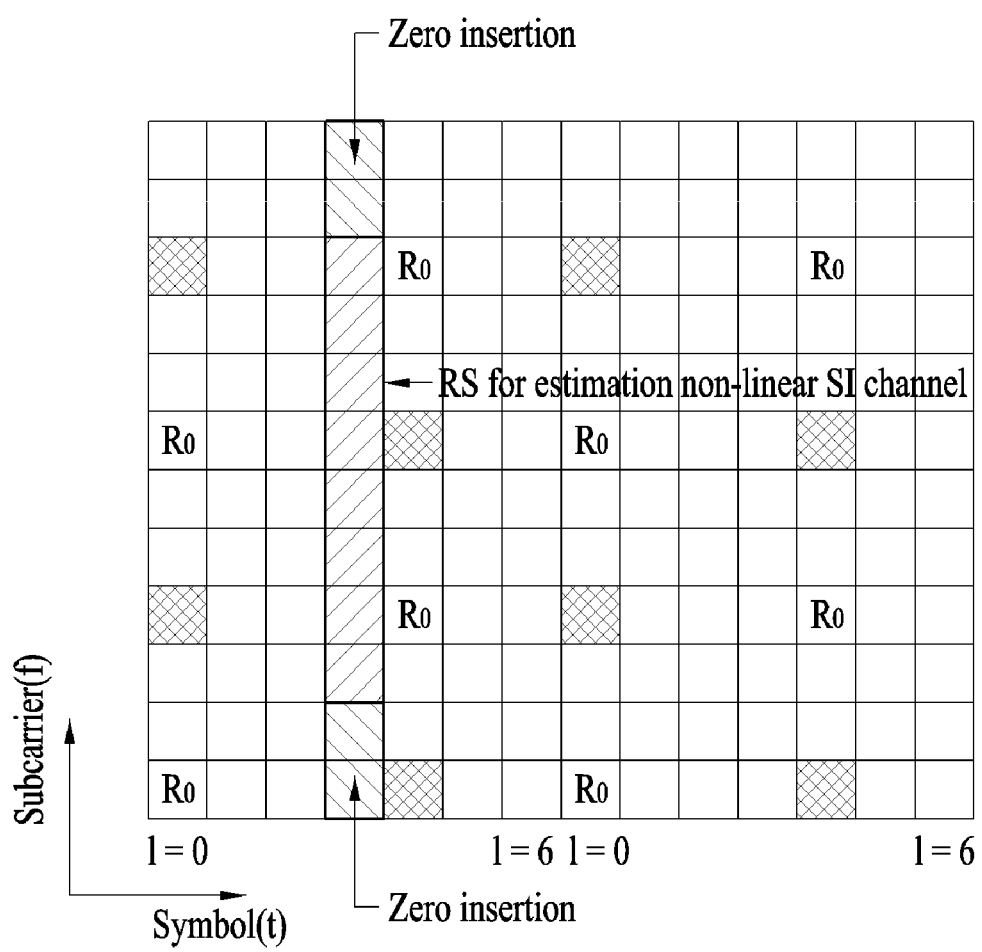
FIG. 15 shows an example of block-type RS allocation in some frequency bands upon downlink transmission based on a 3GPP LTE/LTE-A system.

FIG. 15 shows an example of block-type RS allocation in some frequency bands upon downlink transmission based on a 3GPP LTE/LTE-A system.

Referring to FIG. 15, an RS for non-linear self-interference cancellation may be allocated to the fourth symbol of the subframe. Meanwhile, in FIG. 15, an RS for non-linear self-interference estimation or cancellation may be allocated using symbols or subbands other than the fourth symbol of the specific subframe. For example, as shown in FIG. 15, an RS in which zero insertion is performed with respect to only two symbols located at the lower side of the subframe, an RS in which zero insertion is performed with respect to only two symbols located at the upper side of the subframe, or an RS in which zero insertion is performed irregularly or at a specific interval may be allocated.

Embodiment 2-2

For example, in downlink of a 3GPP LTE system, in the case of system bandwidth of 1.4 MHz, in consideration of compatibility with an existing system, as shown in FIG. 13, an RS for non-linear self-interference estimation or cancellation may be allocated to some frequency bands of the fourth symbol of the first subframe of each frame. In the case of system bandwidths of 3 MHz, 5 MHz, 10 MHz and 20 MHz, in consideration of compatibility with a legacy system, an RS allocation structure having system bandwidth of 1.4 MHz may be extended to the frequency domain such that resource allocation is variously performed.

Figure 16:
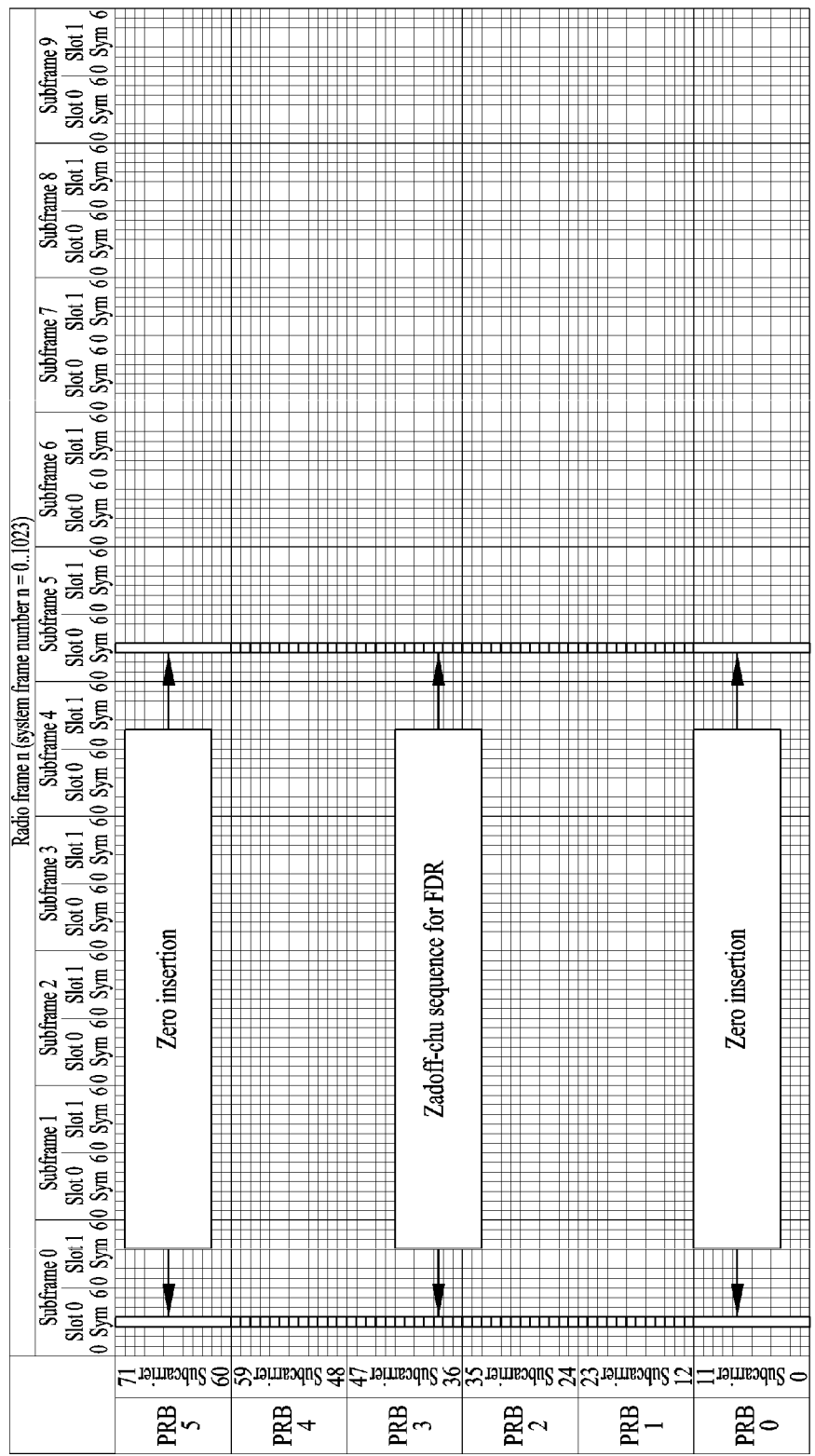
FIG. 16 shows an example of block-type RS allocation to some intermediate sub-bands for non-linear SI channel estimation on downlink in a 3GPP LTE/LTE-A system.

FIG. 16 shows an example of block-type RS allocation to some intermediate sub-bands for non-linear SI channel estimation on downlink in a 3GPP LTE/LTE-A system.

Referring to FIG. 16, for non-linear self-interference estimation, an RS of a block type may be allocated to some intermediate subbands and an RS subjected to zero insertion may be allocated to the other symbols.

Proposal 2-3: Method of Using Symbol of DwPTS of Special Subframe in Order to Apply Proposed Sequence to TDD-LTE Environment For example, in a 3GPP TDD-LTE environment, in consideration of compatibility with a legacy system, an RS for non-linear self-interference cancellation of FDR may be allocated to some symbols of the DwPTS of a special subframe of a frame. In addition, in the case of system bandwidths of 3 MHz, 5 MHz, 10 MHz and 20 MHz, in consideration of compatibility with a legacy system, an RS allocation structure having system bandwidth of 1.4 MHz may be extended to the frequency domain such that resource allocation is variously performed.

Figure 17:
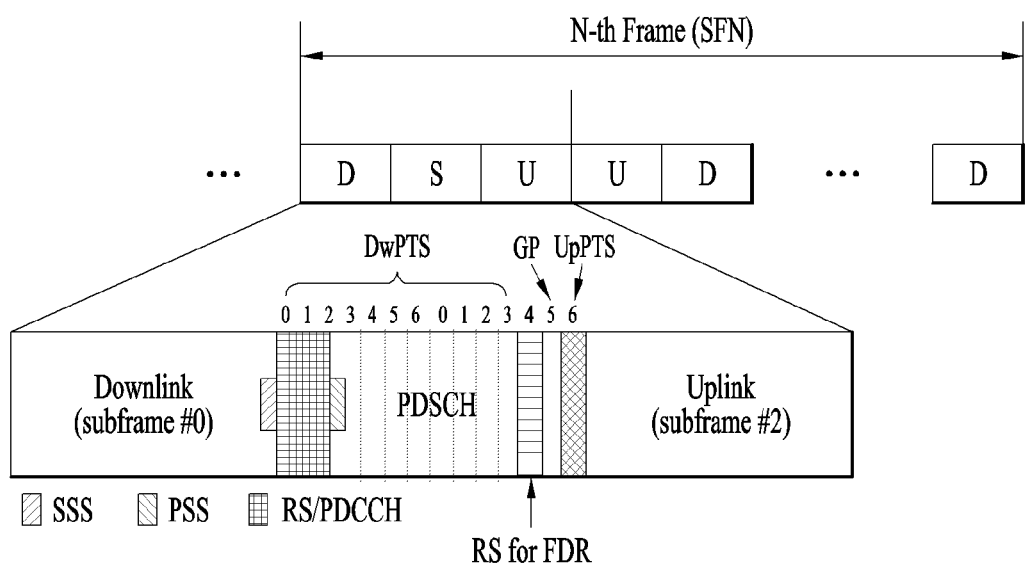
FIG. 17 shows an example of allocating a block-type RS for non-linear self-interference channel estimation to a special subframe in a 3GPP TDD-LTE system.

FIG. 17 shows an example of an example of allocating a block-type RS for non-linear self-interference channel estimation to a special subframe in a 3GPP TDD-LTE system.

FIG. 17 shows the case where special subframe configuration 4 is used. In addition to the last symbol of the DwPTS shown in FIG. 17, an RS for non-linear self-interference estimation or cancellation in an FDR environment may be allocated using another symbol of the DwPTS or a DwPTS symbol in another special subframe configuration. If the symbol of the DwPTS is insufficient as in special subframe configuration 0 or 5, RS resources may be allocated using a specific symbol of a downlink subframe as in Proposal 2-1 or Proposal 2-2.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting a reference signal for channel estimation of a non-linear self-interference signal in a communication system using a full-duplex radio (FDR) scheme is industrially applicable to various wireless communication systems such as a 3GPP LTE/LTE-A system or a 5G communication system.

What is claimed is:

1. A method for transmitting a reference signal for channel estimation of a non-linear self-interference signal by a communication device using a full duplex radio (FDR) scheme, the method comprising:
   transmitting reference signals for channel estimation of the non-linear self-interference signal on a specific symbol of a corresponding subframe,
   wherein a sequence mapped to the reference signals is subjected to discrete Fourier transform (DFT) and generated in a frequency domain, and
   wherein the generated sequence is mapped to a resource element (RE) for the reference signals in the frequency domain.

2. The method according to claim 1, wherein the specific symbol corresponds to a fourth symbol of the corresponding subframe in a time-axis direction.

3. The method according to claim 1, wherein the reference signals are transmitted on the specific symbol of the corresponding subframe in full bandwidth.

4. The method according to claim 1, wherein the reference signals are transmitted on the specific symbol of the corresponding subframe in a specific band.

5. The method according to claim 4, wherein, if the reference signals are transmitted on the specific symbol of the corresponding subframe in the specific band, a reference signal which zero is inserted is transmitted on the specific symbol of the corresponding subframe.

6. The method according to claim 1, wherein the corresponding subframe corresponds to a subframe index 0 or a subframe index 5.

7. A communication device for transmitting a reference signal for channel estimation of a non-linear self-interference signal in a full duplex radio (FDR) environment, the communication system comprising:
   a transmitter; and
   a processor,
   wherein the processor controls the transmitter to transmit reference signals for channel estimation of the non-linear self-interference signal on a specific symbol of a corresponding subframe,
   wherein a sequence mapped to the reference signals is subjected to discrete Fourier transform (DFT) and generated in a frequency domain, and
   wherein the generated sequence is mapped to a resource element (RE) for the reference signals in the frequency domain.

8. The communication device according to claim 7, wherein the specific symbol corresponds to a fourth symbol of the corresponding subframe in a time-axis direction.

9. The communication device according to claim 7, wherein the processor controls the transmitter to transmit the reference signals on the specific symbol of the corresponding subframe in full bandwidth.

10. The communication device according to claim 7, wherein the processor controls the transmitter to transmit the reference signals on the specific symbol of the corresponding subframe in a specific band.

11. The communication device according to claim 10, wherein, if the reference signals are transmitted on the specific symbol of the corresponding subframe in the specific band, the processor controls the transmitter to transmit a reference signal which zero is inserted on the specific symbol of the corresponding subframe.

12. The communication device according to claim 7, wherein the corresponding subframe corresponds to a subframe index 0 or a subframe index 5.

* * * * *